United States Patent [19]

Goodman et al.

[11] 4,226,975

[45] Oct. 7, 1980

[54] PROCESS FOR THE REMOVAL OF VINYL CHLORIDE FROM POLYVINYL CHLORIDE DISPERSIONS AND LATEXES

[75] Inventors: Donald Goodman, Flemington; Marvin Koral, Warren; Robert S. Miller, Bridgewater; Robert J. Stanaback, Gladstone, all of N.J.

[73] Assignee: Tenneco Chemicals, Inc., Saddle Brook, N.J.

[21] Appl. No.: 739,919

[22] Filed: Nov. 8, 1976

Related U.S. Application Data

[63] Continuation-in-part of Ser. No. 604,281, Aug. 13, 1975.

[51] Int. Cl.$^3$ .............................. C08F 6/24; C08F 6/16; C08F 2/20
[52] U.S. Cl. .................................. 528/483; 526/200; 528/490; 528/501
[58] Field of Search .................... 528/483, 480, 490

[56] References Cited

U.S. PATENT DOCUMENTS

| | | | |
|---|---|---|---|
| 2,662,867 | 12/1953 | Hoertz | 260/45.9 R |
| 3,546,192 | 12/1970 | Borsini | 526/344 X |
| 3,956,249 | 5/1976 | Goodman | 528/500 |
| 4,015,064 | 3/1977 | Feldman et al. | |

FOREIGN PATENT DOCUMENTS

| | | | |
|---|---|---|---|
| 957799 | 11/1974 | Canada . | |
| 2162860 | 7/1972 | Fed. Rep. of Germany | 528/500 |
| 2546265 | 4/1976 | Fed. Rep. of Germany | 528/500 |
| 1477266 | 6/1977 | United Kingdom . | |

*Primary Examiner*—C. A. Henderson
*Attorney, Agent, or Firm*—Evelyn Berlow

[57] ABSTRACT

Vinyl chloride is removed from polyvinyl chloride dispersions and latexes by adding to them from 2% to 8% by weight of a polar water-soluble organic compound that has a boiling point between about 50° C. and 150° C. and sparging the resulting mixtures with a gas, such as nitrogen, while they are maintained at subatmospheric pressure.

1 Claim, No Drawings

PROCESS FOR THE REMOVAL OF VINYL CHLORIDE FROM POLYVINYL CHLORIDE DISPERSIONS AND LATEXES

This is a continuation-in-part of our copending application, Ser. No. 604,281, which was filed on Aug. 13, 1975.

This invention relates to a process for the purification of polyvinyl chloride. More particularly, it relates to a process for the removal of residual vinyl chloride from polyvinyl chloride dispersions and latexes.

When vinyl chloride is polymerized in an aqueous medium by suspension or emulsion polymerization techniques, there is obtained a dispersion, latex, or slurry that contains from 5% bo 50% by weight, and in most cases from 15% to 40% by weight of polyvinyl chloride. It also contains up to 5% by weight of residual vinyl chloride. Most of the unreacted monomer is usually removed by heating the dispersion, latex, or slurry under reduced pressure to about 65° C. As it is ordinarily practiced, this stripping procedure reduces the monomer content to about 1000 ppm to 20,000 ppm. Further processing yields dried products that may contain 500 ppm or more of monomer.

In view of the recently-developed safety standards that require that the amount of vinyl chloride in polyvinyl chloride and in the atmosphere that workers breathe be maintained at very low levels, it is necessary that the monomer content of the dispersion, latex, or slurry be sufficiently reduced so that these requirements can be met.

A number of procedures for the removal of residual monomer from polyvinyl chloride dispersions, latexes, and slurries have been proposed, but none has proven to be entirely satisfactory. Procedures that involve heating them to temperatures above 65° C. or subjecting them to conditions of high shear are effective in reducing the vinyl chloride content to low levels, but have an adverse effect on the stability and filterability of the dispersion or latex and on the functional performance of the dried product. In addition, the foaming that often occurs at elevated temperatures creates serious processing problems. Other procedures, for example, sparging with an inert gas or low temperature stripping, either do not reduce the monomer content to the desired very low level or are too slow to be practiced commercially.

In accordance with this invention, an improved process has been developed for the removal of residual monomer from polyvinyl chloride dispersions and latexes. This process rapidly reduces the vinyl chloride content of the dispersion or latex, without affecting its stability and other properties or the properties of the dried polymer. Unlike many of the previously-known monomer removal procedures, the process of this invention does not destabilize the dispersion or latex thereby changing the particle size distribution of the polyvinyl chloride and so does not have a detrimental effect on the filterability of the dispersion or latex, or on the handling and drying characteristics of the wet polymer cake.

In the process of this invention, a small amount of a polar, water soluble organic compound as hereinafter defined is added to a dispersion or latex that contains from 5% to 50% by weight of polyvinyl chloride and from 1000 parts to 20,000 parts by weight of vinyl chloride per million parts by weight of the dispersion or latex. The resulting treated dispersion or latex is then maintained at subatmospheric pressure while it is sparged with an inorganic gas. Following this treatment, the dispersion or latex is further processed to yield a solid product that contains less than 10 ppm and in most cases less than 1 ppm of vinyl chloride. The monomer and gaseous sparging material are removed through the volume system. They may, if desired, be recovered and recycled.

The polar, water-soluble organic compounds that may be present in the dispersion or latex during the sparging step are those that have boiling points between 50° C. and 150° C. and preferably between 75° C. and 100° C. Illustrative of these compounds are acetonitrile, chloroacetonitrile, dimethylformamide, diisopropylamine, 1-chlorobutene-2, and butyl bromide. The preferred polar, water-soluble organic compound is acetonitrile.

The addition of from 2% to 8% by weight of the polar, water-soluble organic compound before the sparging step increases the rate at which vinyl chloride is removed from polyvinyl chloride dispersions and latexes. Particularly advantageous results have been obtained when from 3% to 4% by weight of a polar, water-soluble compound, preferably acetonitrile, was added to the dispersion or latex before the sparging step was begun.

During the removal of vinyl chloride by the process of this invention, the dispersions or latexes that contain the polar compound are maintained at a temperature between 20° C. and 65° C. and at a pressure between about 100 mm. and 600 mm. mercury absolute. They are preferably maintained at a temperature between 40° C. and 60° C. and at a pressure between 100 mm. and 500 mm. mercury absolute while they are sparged. Particularly advantageous results have been obtained when the dispersion or latex was maintained at a temperature between 45° C. and 55° C. and at a pressure between 125 mm. and 400 mm. mercury absolute while it was sparged with nitrogen or ammonia.

The sparging may be carried out by any procedure that will provide maximum contact between the polyvinyl chlorie particles and the sparging material. It is preferably done by passing the sparging material through one or more diffusers that are located beneath the surface of the dispersion or latex.

A wide variety of sparging materials can be used to remove vinyl chloride from polyvinyl chloride dispersions and latexes. They are preferably inorganic gases that do not react with any of the components of the dispersion or latex and that can be recovered readily from the exit gas stream. Examples of these gases are nitrogen, air, ammonia, carbon dioxide, and chlorine. A single inorganic gas or a mixture of two or more of these gases can be used in the process of this invention.

The amount of the sparging material that is used and the rate at which it is introduced are those that will effect rapid removal at vinyl chloride without causing foaming or handling problems. They are dependent upon such factors as the amount of dispersion or latex that is being purified, its vinyl chloride content, and the processing conditions that are employed. The optimum amount of sparging material and the optimum sparging rate for each dispersion or latex and for each set of processing conditions can be readily determined by carrying out a few preliminary experiments.

As used herein, the term "polyvinyl chloride" includes both the high molecular weight homopolymers of vinyl chloride and the high molecular weight copolymers formed by the copolymerization of vinyl chloride with an essentially water-insoluble ethylenically-unsaturated monomer that is copolymerizable therewith. Suitable comonomers include vinyl acetate, vinyl propionate, vinyl butyrate, vinyl stearate, vinyl benzoate, ethylene, propylene, ethyl acrylate, acrylic acid, acrylamide, acrylonitrile, methacrylonitrile, vinylidene chloride, dialkyl fumarates and maleates, vinyl ethers, and the like. When one or more of these comonomers are used, the monomer component contains at least 70% and preferably 80% to 90% of vinyl chloride.

The polyvinyl chloride dispersions and latexes that are treated in accordance with the process of this invention to remove residual vinyl chloride from them may be prepared by the well-known suspension or emulsion polymerization processes. In the suspension polymerization processes, the monomer is suspended in water by a suspending agent and agitation. The polymerization is initiated with a suitable free radical generating polymerization initiator, such as lauroyl peroxide, benzoyl peroxide, diisopropyl peroxydicarbonate, di-2-ethylhexyl peroxydicarbonate, tertiary butyl peroxypivalate, azobisisobutyronitrile, azobis-2,4-dimethylvaleronitrile, and mixtures thereof. Suspending agents that may be used include methylcellulose, hydroxymethylcellulose, hydroxyethylcellulose, hydrolyzed polyvinyl acetate, gelatin, methyl vinyl ether-maleic anhydride copolymers, and the like. In emulsion polymerization processes, the polymerization initiator may be hydrogen peroxide, an organic peroxide, a persulfate, or a redox system. Surface-active agents, such as alkyl sulfates, alkane sulfonates, alkyl aryl sulfonates, and fatty acid soaps are used as emulsifiers in these processes. A preferred method of preparing these polymers is described in U.S. Pat. No. 2,981,722, which was granted to Enk et al. on Apr. 25, 1961. The reaction mixtures produced by these processes are usually heated under vacuum to about 60° C. to 65° C. to remove most of the unreacted monomer from them. The resulting stripped dispersions and latexes, generally contain 5% to 50% and preferably 15% to 40% by weight of polyvinyl chloride as particles that range in size from about 0.01 micron to 5 microns, and preferably from 0.05 micron to 2 microns, and from about 1000 ppm to 20,000 ppm of vinyl chloride. Following the removal of vinyl chloride from them by the process of this invention, the dispersion or latex may be dewatered, for example, on a rotary drum filter, and then dried, or it may be spray dried. The polyvinyl chloride prepared in this way has a vinyl chloride content of less than 10 ppm, and in many cases, less than 1 ppm. It can be further processed without creating a health hazard.

The invention is further illustrated by the following examples. In these examples and throughout the application, the terms "parts per million" and "ppm" mean parts by weight of vinyl chloride per million parts by weight of polymer.

EXAMPLES 1-3

A. A polyvinyl chloride latex was prepared by the following procedure:

An aqueous dispersion containing vinyl chloride, a mixture of lauroyl peroxide and di-2-ethylhexyl peroxydicarbonate as the initiator, ammonium oleate as the emulsifier, and methylcellulose as the suspending agent was homogenized and then polymerized to form a latex containing about 32% of polyvinyl chloride in the form of particles ranging in size from 0.05 micron to 5 microns. The latex was heated under vacuum at a temperature below 65° C. to reduce its vinyl chloride content to less than 10,000 parts per million.

B. To 1000 gram portions of a latex prepared by the procedure described in paragraph A and that contained 7680 ppm of vinyl chloride were added small amounts of acetonitrile. The resulting mixtures were then sparged with ammonia or nitrogen at the rate of 0.22 cubic feet per hour while they were maintained at subatmospheric pressure. Samples were taken periodically and analyzed to determine the amount of vinyl chloride that had been removed. The conditions employed and the results obtained are given in the following table.

C. For comparative purposes, 1000 gram portions of the latex or dispersion in two-liter flasks were either sparged with a gas or subjected to subatmospheric pressure for periods ranging from 2 hours to 40 hours. Samples were taken periodically and analyzed to determine the amount of monomer that was present. The conditions employed and the results obtained are given in the table.

From the data in the table, it will be seen that the process of this invention is substantially more effective than either vacuum treatment or sparging at atmospheric pressure in removing vinyl chloride from a polyvinyl chloride latex or dispersion.

TABLE

| | Sparge Gas | Temp. °C. | Pressure mm Hg | % Acetonitrile Added | % Vinyl Chloride Removed in Indicated Time | | |
|---|---|---|---|---|---|---|---|
| | | | | | 1 Hr. | 2 Hrs. | 3 Hrs. |
| Ex. No. | | | | | | | |
| 1 | NH₃ | 45 | 230 | 2 | 81.5 | 94.2 | 97.8 |
| 2 | NH₃ | 45 | 230 | 4 | 98.7 | 99.7 | 99.9 |
| 3 | NH₃ | 50 | 230 | 4 | 99.0 | 99.9 | >99.9 |
| 4 | N₂ | 50 | 230 | 3 | 96.2 | 99.0 | 99.8 |
| Comp. Ex. | | | | | | | |
| A | NH₃ | 45 | 760 | — | 55.3 | 61.3 | 75.2 |
| B | N₂ | 50 | 760 | — | 49.3 | 66.1 | 73.0 |
| C | None | 45 | 230 | 2 | 56.4 | 76.4 | 79.6 |

Similar results are obtained when a latex or dispersion that contains polyvinyl chloride and from 2 to 8 percent by weight of formamide is sparged with an inorganic gas, such as air or nitrogen, while it is maintained at a temperature between 40° C. and 60° C. and at a pressure between 100 mm and 600 mm absolute.

What is claimed is:

1. The process for the removal of vinyl chloride from an aqueous dispersion or latex that contains from about 1000 parts to 20,000 parts by weight of vinyl chloride per million parts by weight of said dispersion or latex and from 5% to 50% by weight of a vinyl chloride polymer selected from the group consisting of polyvinyl chloride and copolymers of vinyl chloride and at least one monomer copolymerizable therewith that comprises the steps of
   (a) adding to the dispersion or latex from 2% to 8% by weight of a polar, water-soluble organic compound selected from the group consisting of acetonitrile, chloroacetonitrile, formamide, dimethylformamide, diisopropylamine, 1-chlorobutene-2, and butyl bromide, and
   (b) maintaining the resulting dispersion or latex at subatmospheric pressure while sparging it with ammonia until the dispersion or latex contains less than about 10 parts by weight of vinyl chloride per million parts by weight of said vinyl chloride polymer.

* * * * *